Jan. 5, 1937.  M. A. LEVIN  2,066,477
PROGRESSIVE STENCIL DEVICE
Filed June 26, 1935
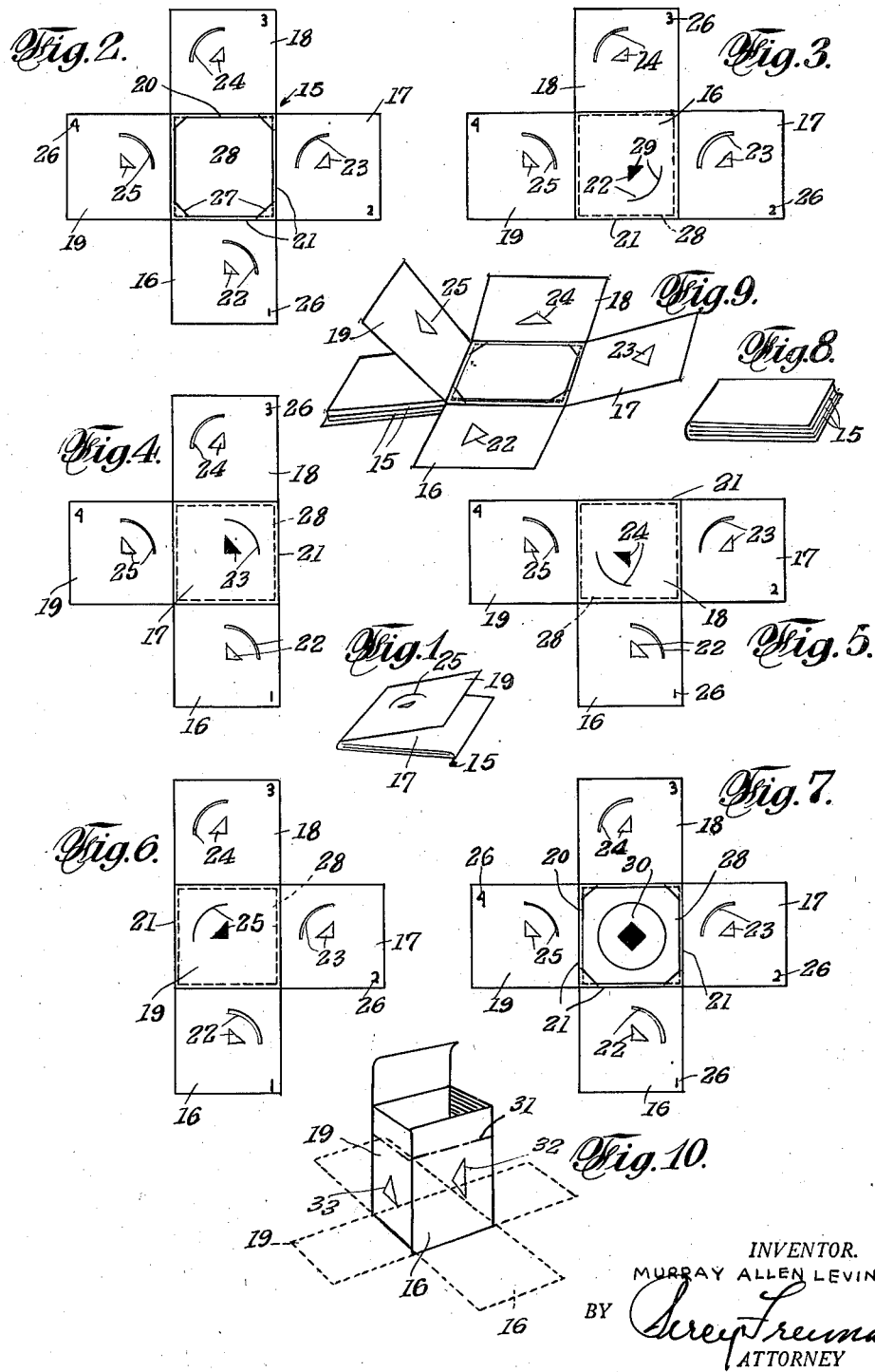
INVENTOR.
MURRAY ALLEN LEVIN
BY
ATTORNEY Patented Jan. 5, 1937

2,066,477

UNITED STATES PATENT OFFICE 2,066,477

PROGRESSIVE STENCIL DEVICE

Murray Allen Levin, New York, N. Y.

Application June 26, 1935, Serial No. 28,409

1 Claim. (Cl. 101—115)

This invention relates to devices for the education and amusement of children although also adapted for use by adults for diversion.

The invention seeks to provide a simple and inexpensive device whereby designs, drawings, and other like configurations may be applied to a sheet by those having little or no aptitude for drawing.

The invention further seeks to provide an economical device comprising a sheet having foldable portions, each of said portions bearing a different stenciled part of a complete design, and each being successively superposable over a sheet of paper whereby the complete design may be drawn on said sheet of paper through said stenciled portions by unskilled persons.

The invention also contemplates the provision of a plurality of devices as above contemplated, bound together into a book-like structure, the stenciled portions of the devices forming said book comprising a variety of subjects adapted to be drawn upon blank sheets placed in proper relation with the foldable stenciled portions of any one of said devices.

Another contemplated feature of the invention resides in the provision of a carton in which edibles such as cereal foods may be sold and providing said carton with scored lines or other markings rendering the carton adaptable for conversion into a device as above set forth and thereby enhancing the sales appeal of the food contained therein.

The foregoing contemplated features of the invention and the preferred means for their attainment are more clearly detailed in the following specification, descriptive of the accompanying drawing illustrating several embodiments of the invention.

In the drawing:

Fig. 1 is a perspective view of a preferred form of device as contemplated in the present invention.

Fig. 2 is a plan view of the device with its stenciled portions opened to disclose the blank sheet upon which the design formed by the stencils is to be drawn.

Figs. 3, 4, 5 and 6 are similar views illustrating the manner of use of the device.

Fig. 7 is a view similar to Figure 1 showing the design already drawn upon the blank sheet.

Fig. 8 is a perspective view of a book-like structure comprising a plurality of such devices.

Fig. 9 is a perspective view of the structure shown in Figure 8 opened and ready for use.

Fig. 10 is a perspective view of another form of the invention comprising a carton adapted to be converted into a device as shown in Figure 1.

Referring to the drawing in greater detail and with reference to Figures 1 to 7 inclusive, the device comprises a blank 15, shaped in the form of a cross having equal arms 16, 17, 18 and 19 joined together by a common central portion 20.

Each arm is adapted to be folded over and superposed on the portion 20 by bending on the scored line 21 or the like.

Each of said arms 16, 17, 18 and 19 is provided with a different stenciled portion of an entire design as shown respectively at 22, 23, 24 and 25, and each may be numbered or otherwise indexed as at 26, said numbers being readable in association with instructions which may be supplied with the device.

While in the present disclosure the stenciled design is shown as a simple square circumscribed by a circle, it is apparent that stencils of animals, fruit, or other animate and inanimate objects may be employed.

The portion 20, at each of its corners, is preferably slitted as at 27 for the reception of the corners of a blank sheet 28 upon which the design of the stencils is to be applied. The device may be supplied with a stack of such blank sheets to be used successively.

In use, one of the arms such as 16 is folded over in superposed relation on the blank sheet 28 and that part of said sheet which is exposed through the stencil 22 is filled in as at 29 with pencil, crayon or the like. Different colors or shadings thereof may be employed according to the artistic whims of the user.

When this first part of the design is so drawn, the arm 16 is returned to its opened-out position, and another arm such as 17 is then superposed over the sheet 28 and the drawing process repeated. This is repeated with all four arms until the complete design such as indicated at 30 (Figure 7) is drawn upon the surface of the sheet 28.

The sheet 28 may now be removed and at any time thereafter the drawing process may be repeated and for variety, different colorings and shading effects may be utilized to obtain a variety of pleasing designs.

As shown in Figures 8 and 9, a plurality of devices 15 may be bound together in the form of a book, the stenciled designs of which may differ to offer a more comprehensive educational and amusement article.

The invention may be utilized to enhance the sales appeal of a food-containing carton. One manner of accomplishing this is shown in Figure 10 wherein the sides of the carton are provided with perforations or with severing lines 31 so the top thereof may be removed after the contents have been used and the corners between adjacent sides of the carton then slitted so a blank such as provided in Figure 1, is obtained.

The sides of the carton may be provided with designs as heretofore described, except in this case the design portions are preferably in the form of knockouts 32 which may remain in place while the carton is used as such, but which may be removed to provide the stencils referred to.

As can be seen from the foregoing, a simple device for the purpose has been provided in its simple forms of embodiment, and since changes may well be made without departing from the true spirit and scope of the invention as herein disclosed, interpretation thereof should rather be based on the prior art.

What is claimed as new and desired to secure by Letters Patent, is:

As a new article of manufacture, an educational and amusement device comprising an integral cross-shaped sheet having a different portion of a stenciled design on each arm thereof, means for positively retaining a blank sheet upon the central portion of the cross-shaped sheet comprising slitted corner portions of said central portion adapted to engage the corners of said blank sheet, and means adapting each of said arms to be folded in superposed relation over said blank sheet.

MURRAY A. LEVIN.